(12) United States Patent
Murakami et al.

(10) Patent No.: US 8,346,384 B2
(45) Date of Patent: Jan. 1, 2013

(54) CUTTING MACHINE, CONTROL UNIT AND RECORDING MEDIUM

(75) Inventors: Kazuhito Murakami, Nagakute-cho (JP); Kazutoki Otake, Nagakute-cho (JP); Hiroshi Murata, Anjo (JP); Yutaka Matsunaga, Anjo (JP); Takeshi Nishimiya, Anjo (JP)

(73) Assignee: Makita Corporation, Anjo (JP)

( * ) Notice: Subject to any disclaimer, the term of this patent is extended or adjusted under 35 U.S.C. 154(b) by 475 days.

(21) Appl. No.: 12/457,753

(22) Filed: Jun. 19, 2009

(65) Prior Publication Data
US 2010/0011926 A1    Jan. 21, 2010

(30) Foreign Application Priority Data
Jul. 18, 2008  (JP) ................................. 2008-187702

(51) Int. Cl.
*G06F 19/00* (2006.01)

(52) U.S. Cl. ......................... 700/177; 715/863; 83/477.2

(58) Field of Classification Search .................. 700/174, 700/177, 215; 83/13, 477.2; 715/863; 348/222.1
See application file for complete search history.

(56) References Cited

U.S. PATENT DOCUMENTS

| 7,290,474 B2 * | 11/2007 | Keller | 83/477.2 |
| 2006/0096425 A1 | 5/2006 | Keller | |
| 2007/0118820 A1 * | 5/2007 | Hatakeyama | 715/863 |
| 2010/0300257 A1 * | 12/2010 | Loewe et al. | 83/360 |
| 2011/0054665 A1 * | 3/2011 | Wingbermuehle et al. | 700/174 |
| 2011/0167970 A1 * | 7/2011 | Niehsen et al. | 83/13 |

OTHER PUBLICATIONS

Barrho, J.; Adam, M.; Kiencke, U.; , "Finger Localization and Classification in Images based on Generalized Hough Transform and Probabilistic Models," Control, Automation, Robotics and Vision, 2006. ICARCV '06. 9th International Conference on , vol., No., pp. 1-6, Dec. 5-8, 2006.*

* cited by examiner

*Primary Examiner* — Dave Robertson
(74) *Attorney, Agent, or Firm* — Oliff & Berridge, PLC

(57) ABSTRACT

A cutting machine of the present invention for cutting a material to be cut, which is placed on a table, with a rotating saw blade, includes an imaging device, a determination device and a stopping device. The imaging device takes a video image of an area on the table and outputs the video image. The determination device makes a determination on whether or not a number of pixels of a specific color, which is previously set, exceeds a predetermined threshold in one frame of image constituting the video image outputted from the imaging device. The stopping device stops rotation of the saw blade when it is determined by the determination device that the number of pixels of the specific color exceeds the predetermined threshold.

9 Claims, 10 Drawing Sheets

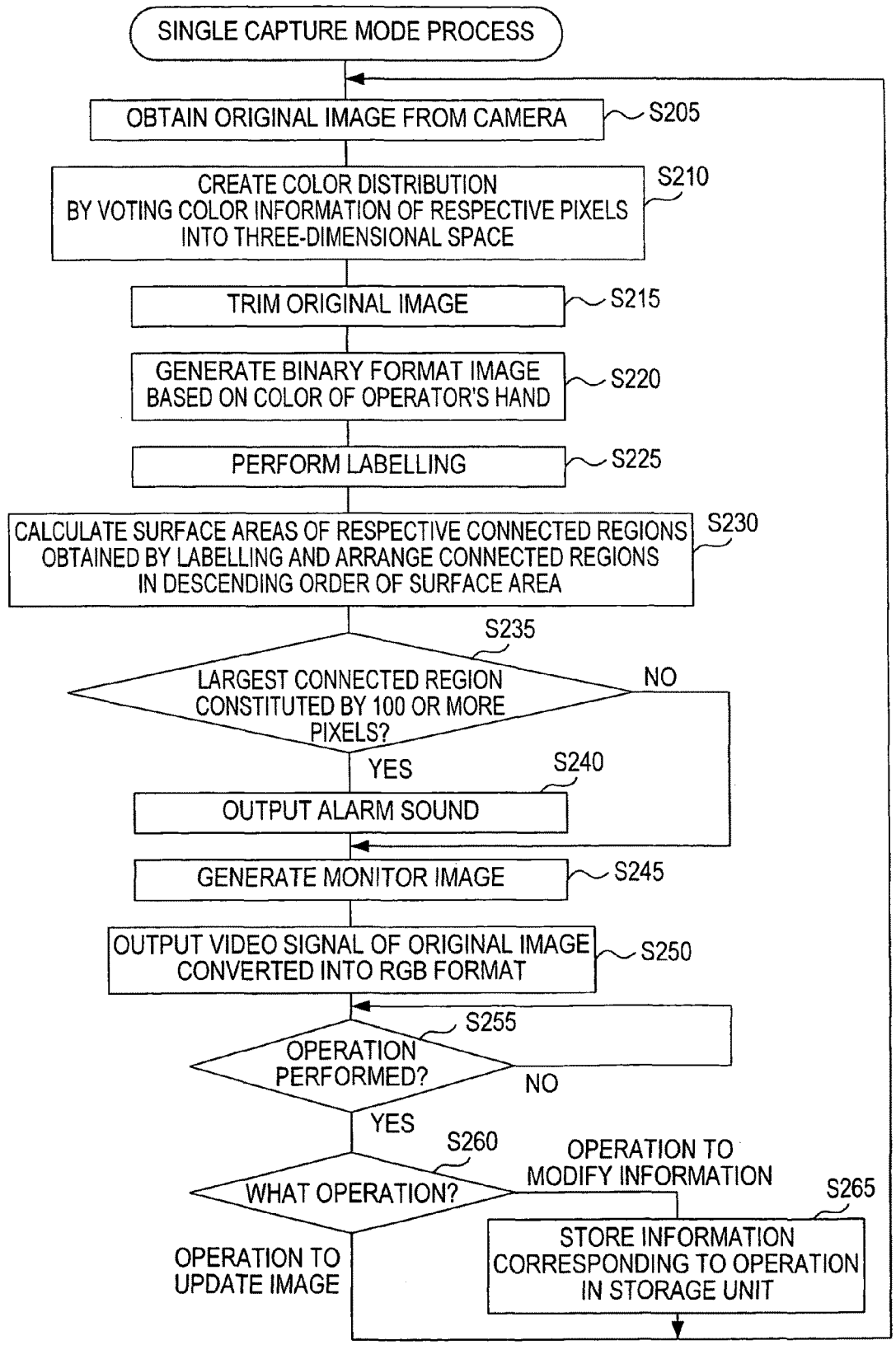

CUTTING MACHINE, CONTROL UNIT AND RECORDING MEDIUM

CROSS-REFERENCE TO RELATED APPLICATIONS

This application claims the benefit of Japanese Patent Application No. 2008-187702 filed Jul. 18, 2008 in the Japan Patent Office, the disclosure of which is incorporated herein by reference.

BACKGROUND

The present invention relates to a cutting machine that cuts a material to be cut, which is placed on a table, with a saw blade.

There is a known conventional cutting machine, such as a circular sawing machine. The cutting machine includes a table for placing thereon a material to be cut as a cutting object, a disk-shaped saw blade projecting upward above an upper surface of the table, an electric motor for rotating the saw blade, and others. By using the cutting machine, an operator can cut the material to be cut at a desired point by moving the material to be cut on the table to press the material to be cut against the rotating blade.

There have been proposed some mechanisms for avoiding contact of the operator's hand with the saw blade regarding the above cutting machine. One of the mechanisms is as described in U.S. Patent Application Publication No. 2006/0096425. In the mechanism, when an operator's hand is detected in a previously defined zone, a pin is pushed out by an explosive or the like, and a tip end of the pin penetrates the rotating saw blade, thereby stopping the rotating saw blade. According to the mechanism, it is possible to stop rotation of the saw blade before the operator's hand touches the saw blade.

SUMMARY

In order to achieve sufficient effects in the mechanism described in U.S. Patent Application Publication No. 2006/0096425, it is required to accurately and promptly distinguish whether an object which has entered the previously defined zone is the material to be cut or the operator's hand. In addition to the distinction of the object, it is also required to detect entry of the operator's hand into the zone at an early stage of the entry.

U.S. Patent Application Publication No. 2006/0096425 describes some conventional examples of methods for distinguishing between the operator's hand and the material to be cut. Specifically, the examples are a method for distinguishing by the difference in shape, a method for distinguishing by the difference in movement, and a method for distinguishing by the difference in surface temperature. However, there is no proposal of a specific method for accurately and promptly distinguishing between the operator's hand and the material to be cut. There is no proposal, either, of a specific method for detecting entry of the operator's hand into the zone at an early stage of the entry.

In a first aspect of the present invention, it is desirable to provide a cutting machine capable of accurately and promptly distinguishing whether an object which has entered a previously defined zone is a material to be cut or an operator's hand and detecting entry of the operator's hand into the zone at an early stage of the entry.

The first aspect of the present invention provides a cutting machine for cutting a material to be cut, which is placed on a table, with a rotating saw blade. The cutting machine includes an imaging device, a determination device and a stopping device. The imaging device takes a video image of an area on the table and outputs the video image. The determination device makes a determination on whether or not a number of pixels of a specific color, which is previously set, exceeds a predetermined threshold in one frame of image constituting the video image outputted from the imaging device. The stopping device stops rotation of the saw blade when it is determined by the determination device that the number of pixels of the specific color exceeds the predetermined threshold.

The "video image" here means a so-called moving image, which is constituted by a plurality of frames of images. The "specific color" here may mean a color of an operator's hand or a color of a glove. Since a hand's color, for example, may vary depending on each individual and on a part of the hand, it is preferable to set a plurality of colors or a specific color range as the "specific color". It is also preferable that the "specific color" includes as few colors as possible, other than the color of the operator's hand.

According to the cutting machine of the present invention, as described above, a determination is made on whether or not the number of pixels indicating the operator's hand exceeds a predetermined threshold, and rotation of the saw blade is stopped based on the determination. Compared with, for example, a cutting machine that determines whether an object is a hand or a material to be cut based on its shape, more rapid determination may be achieved since relatively voluminous calculation, such as analysis of shape (e.g., pattern matching), is not required.

Also, as long as the specific color is appropriately set, the material to be cut and the operator's hand can be distinguished accurately. Further, according to the present invention, a determination that a hand is present in an image may be made before a shape of the hand appears in the image sufficiently (when a surface area of a region corresponding to a hand's color exceeds a predetermined threshold in the image), while a determination on whether an object is a hand or a material to be cut based on its shape cannot be made unless a shape of a hand appears sufficiently in the image. For example, a determination that a hand is present in the image can be made at a stage when a finger tip appears in the image.

Therefore, according to the cutting machine of the present invention, it is possible to accurately and promptly distinguish whether an object which has entered an image is a material to be cut or an operator's hand and also detect entry of the operator's hand into the image at an early stage of the entry.

The determination device may make the determination as the following. Specifically, the determination device may generate a binary format image from the one frame of image constituting the video image outputted from the imaging device depending on whether or not each of pixels has the specific color which is previously set or another color, perform labeling of the binary format image, and determine whether or not a number of pixels constituting a largest connected region among connected regions obtained by the labeling exceeds a predetermined threshold.

When the determination device determines according to the above, an appropriate determination may be achieved on whether or not the number of pixels of the specific color exceeds a predetermined threshold.

The determination device may make the determination covering an entire area (all pixels) of the image obtained from the imaging device, or may make the determination covering pixels which are present in a predetermined area in the one frame of image constituting the video image outputted from the imaging device. The "predetermined area" here suitably means an area around the saw blade, which may be a fixedly specified area or may be an area specified by the operator.

According to the above configuration, it is possible to obtain an appropriate entry detection area of the operator's hand without adjusting an imaging target area by changing a position of the imaging device or a zooming degree of the imaging device. Also, a more rapid determination can be achieved since a processing load on the determination device is reduced compared with a case of determination covering the entire area (all pixels) of the image obtained from the imaging device.

It is preferable that the specific color can be set later although may be set at the time of manufacture of the cutting machine. To allow this, the cutting machine may be configured as below. Specifically, the cutting machine may further include a storage device that stores information on the specific color to which the determination device refers and a setting device that determines the specific color based on the video image outputted from the imaging device and causes the storage device to store the specific color.

According to the cutting machine configured as above, it is possible to set a specific color by causing the imaging device to take an image of the operator's hand, and thus setting of an appropriate specific color can be achieved easily.

The cutting machine may also be configured as below. Specifically, the cutting machine may further include a display device that displays a color palette, a storage device that stores information on the specific color to which the determination device refers, and a setting device that causes the storage device to store a color at a position, which is specified by an operator on the color palette displayed on the display device, as the specific color.

According to the cutting machine configured as above, the operator may set the specific color while looking at the color palette, and thus more intuitive setting of the specific color can be achieved compared with a case of setting the specific color by inputting a numeric value.

In this case, the display device preferably displays areas in the color palette corresponding respectively to colors included in the one frame of image constituting the video image outputted from the imaging device, so as to be distinguishable from areas corresponding to colors not included in the one frame of image. Then, the operator may set the specific color while recognizing color distribution in the image, and thus more appropriate setting of the specific color can be achieved.

The cutting machine provided with the above described setting device preferably further includes a first restriction device that restricts rotation of the saw blade, once a predetermined event occurs, until information on the specific color is newly stored in the storage device by the setting device. The "predetermined event" here may mean, for example, "a starting of power supply to the cutting machine", "an operation of a saw blade rotation stop switch", or "reaching of a counted value indicating a rotation stop duration of the saw blade to a predetermined value".

According to the cutting machine provided with the above described first restriction device, once a predetermined event occurs, setting by the setting device is necessarily performed. Thus, the cutting machine is more likely to be used in a state with a more appropriate specific color being set.

The cutting machine preferably further includes a second restriction device that restricts restart of rotation of the saw blade, when it is determined by the determination device that the number of pixels of the specific color exceeds the predetermined threshold.

According to the cutting machine provided with the above described second restriction device, it is possible to prevent the saw blade from starting rotation caused by pressing of an operation switch or the like despite the presence of the operator's hand in a vicinity of the saw blade.

A second aspect of the present invention provides a control unit for an electric saw including a video image obtaining device, a determination device and a stopping device. The video image obtaining device obtains, from an imaging device which takes a video image of an area on a table, the video image. The determination device generates a binary format image from one frame of image constituting the video image obtained by the video image obtaining device, depending on whether or not each of pixels has a specific color which is previously set or another color, performs labeling of the binary format image, and determines whether or not a number of pixels constituting a largest connected region among connected regions obtained by the labeling exceeds a predetermined threshold. The stopping device stops rotation of a saw blade when it is determined by the determination device that the number of pixels exceeds the predetermined threshold.

Therefore, according to the control unit for an electric saw in the second aspect of the present invention, it is possible to accurately and promptly distinguish whether an object which has entered an image is a material to be cut or an operator's hand and also detect entry of the operator's hand into the image at an early stage of the entry.

A third aspect of the present invention provides a program for causing the computer to execute a video image obtaining step, a determination step and a stopping step. In the video image obtaining step, obtainment, from an imaging device which takes a video image of an area on a table, of the video image is performed. In the determination step, a binary format image is generated from one frame of image constituting the video image obtained in the video image obtaining step, depending on whether or not each of pixels has a specific color which is previously set or another color, labeling of the binary format image is performed, and it is determined whether or not a number of pixels constituting a largest connected region among connected regions obtained by the labeling exceeds a predetermined threshold. In the stopping step, rotation of a saw blade is stopped when it is determined in the determination step that the number of pixels exceeds the predetermined threshold.

Therefore, according to the program in the third aspect of the present invention, it is possible to accurately and promptly distinguish whether an object which has entered an image is a material to be cut or an operator's hand and also detect entry of the operator's hand into the image at an early stage of the entry.

BRIEF DESCRIPTION OF THE DRAWINGS

The present invention will now be described in an embodiment by way of example with reference to the accompanying drawings, in which:

FIG. 6 is a flowchart for illustrating a single capture mode process;

DETAILED DESCRIPTION OF THE PREFERRED EMBODIMENTS

Explanation of Structure

Figure 1:
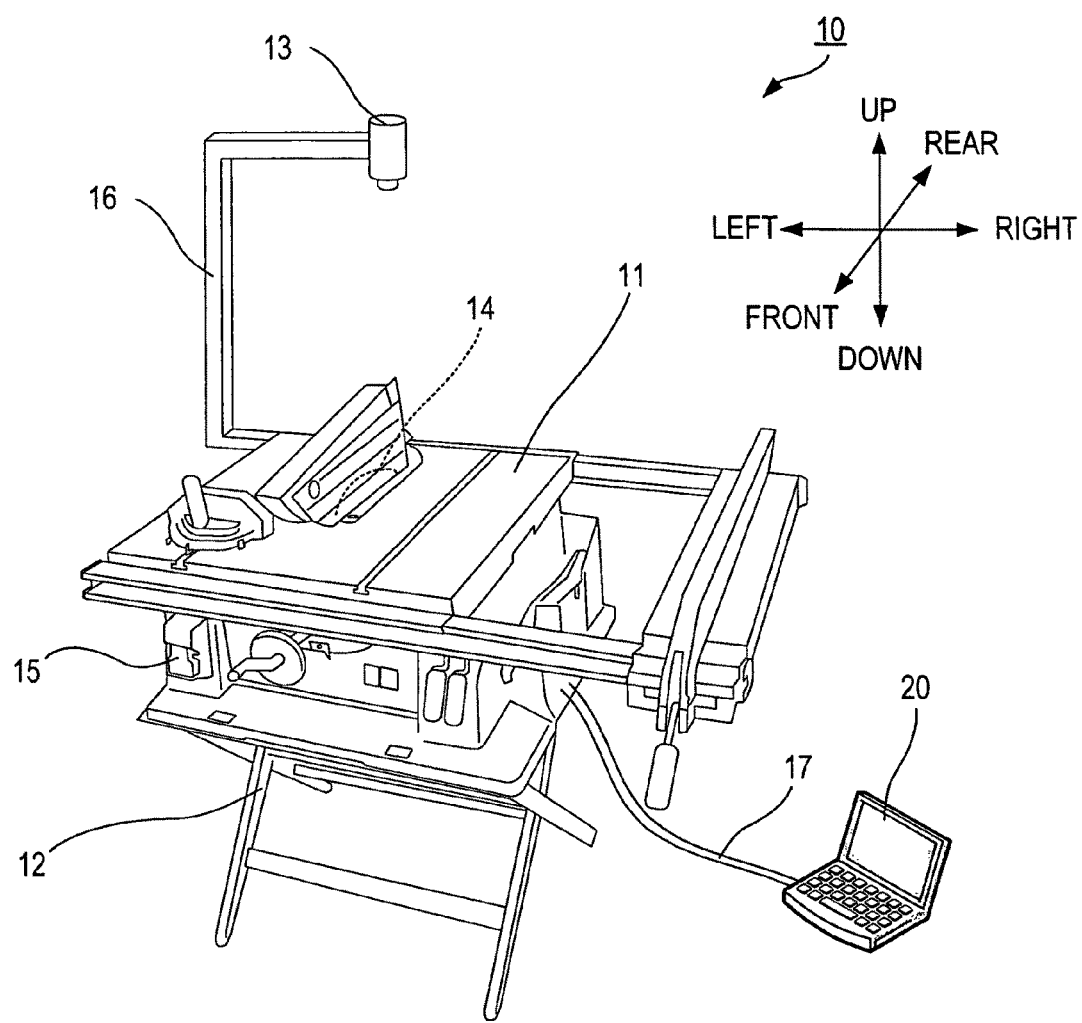
FIG. 1 is a perspective view of a cutting machine in the embodiment.

FIG. 1 shows a cutting machine 10 which is a fixed cutting machine, so-called a "table saw". The cutting machine 10 includes a table 11, a rack 12, a cutting machine body (not shown), a camera 13 and a control apparatus 20. The table 11 is for placing thereon a material to be cut (not shown). The rack 12 is for supporting the table 11 in a horizontal state. The cutting machine body is provided above the rack 12 and under the table 11. The camera 13 is for taking an image of an area on the table 11. The control apparatus 20 is for outputting a stop signal for urgently stopping an electric motor included in the cutting machine body.

In FIG. 1, the control apparatus 20 is configured separately from the table 11 or the like, and is connected to the table 11 or the like with a cable 17. However, the control apparatus 20 may be configured integrally with the table 11 or the like by, for example, housing the control apparatus 20 under the table 11 or the like.

Portions constituting the cutting machine 10 will be described in detail below. The cutting machine body includes a saw blade 14, an upper portion of which projects upward above an upper surface of the table 11 in a central part of the table 11. The saw blade 14 is rotated by an electric motor (not shown). The switching between operating states of the electric motor, "an ON state" and "an OFF state", is performed by an operation switch 15. The electric motor can be stopped also by a stop signal from the control apparatus 20.

The camera 13 is fixed above the table 11 with an arm 16 and outputs a color video signal obtained by a color imaging device, such as a CCD, to the control apparatus 20 through the cable 17. While the color video signal outputted from the camera 13 is in YUV format in the present embodiment, other formats (for example, RGB format or the like) may be employed.

Figure 2:
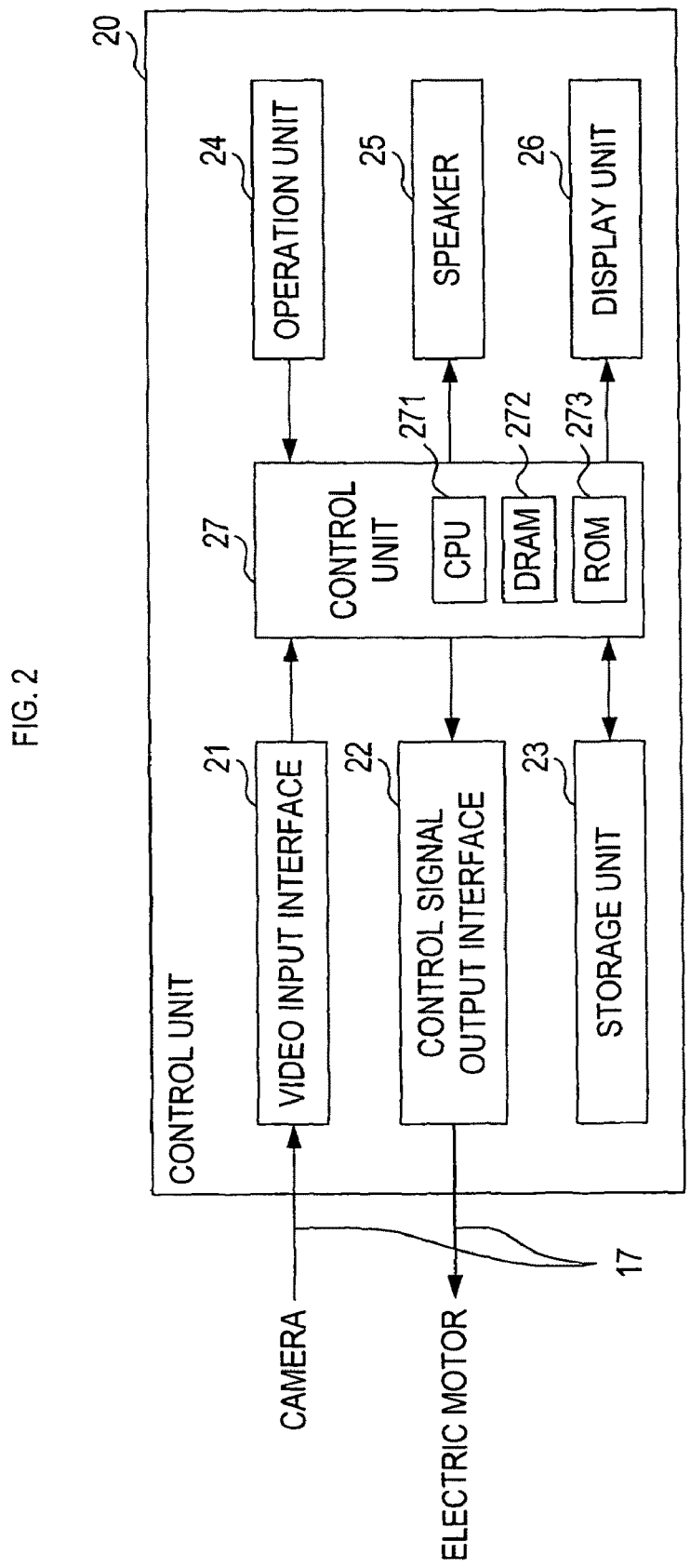
FIG. 2 is a functional block diagram of a control apparatus.

The control apparatus 20 connected to the cutting machine 10 with the cable 17 will be described in detail below with reference to the functional block diagram in FIG. 2. The control apparatus 20 includes a video input interface 21, a control signal output interface 22, a storage unit 23, an operation unit 24, a speaker 25, a display unit 26 and a control unit 27.

The video input interface 21 is an interface for inputting a color video signal from the camera 13 through the cable 17. The control signal output interface 22 is an interface for outputting a stop signal to stop the electric motor through the cable 17. The storage unit 23 includes a nonvolatile storage device, such as a hard disk, a flash memory, or the like, and stores various data. The storage unit 23 previously stores program data for executing later described operations. The operation unit 24 includes a keyboard, a touchpad, or the like, and receives operation commands from an operator. The speaker 25 outputs sound based on an audio signal. The display unit 26 includes a liquid crystal panel or an organic EL panel and displays thereon various images, characters, and the like.

The control unit 27 includes a CPU 271, a DRAM 272, a ROM 273 and various controllers (a memory controller, a graphic controller, etc. not shown), and executes a variety of processes in accordance with the program. Specifically, the control unit 27 inputs a video signal from the camera through the video input interface 21, outputs a signal to the electric motor through the control signal output interface 22, reads various data from the storage unit 23 and writes various data thereto, inputs an operation command from the operator through the operation unit 24, outputs an audio signal to the speaker 25, and outputs a video signal to the display unit 26.

Description of Operations

Operations of the cutting machine 10 will now be described mainly regarding the matters related to the present invention. The cutting machine 10 has a safety function operating state and an adjustment state.

In the safety function operating state, the operator can cut a material to be cut by operating the operation switch 15 thereby to rotate the saw blade 14. When it is detected that the operator's hand has entered a predetermined area on the table 11, stopping of the rotating saw blade 14 and rotation starting restriction of the stopped saw blade 14 are performed. The stopping of the rotating saw blade 14 and rotation starting restriction of the stopped saw blade 14 can be achieved, for example, by controlling the rotation of the electric motor.

On the other hand, in the adjustment state, the operator cannot cut a material to be cut since the saw blade 14 is not rotated even when the operation switch 15 is operated. In the adjustment state, it is possible to adjust setting information regarding the detection of entry of the operator's hand into the predetermined area on the table 11.

The safety function operating state and the adjustment state are alternative to each other. The operations of the cutting machine 10 in the safety function operating state and the adjustment state, respectively, will be described separately below.

(1) Safety Function Operating State

Figure 3:
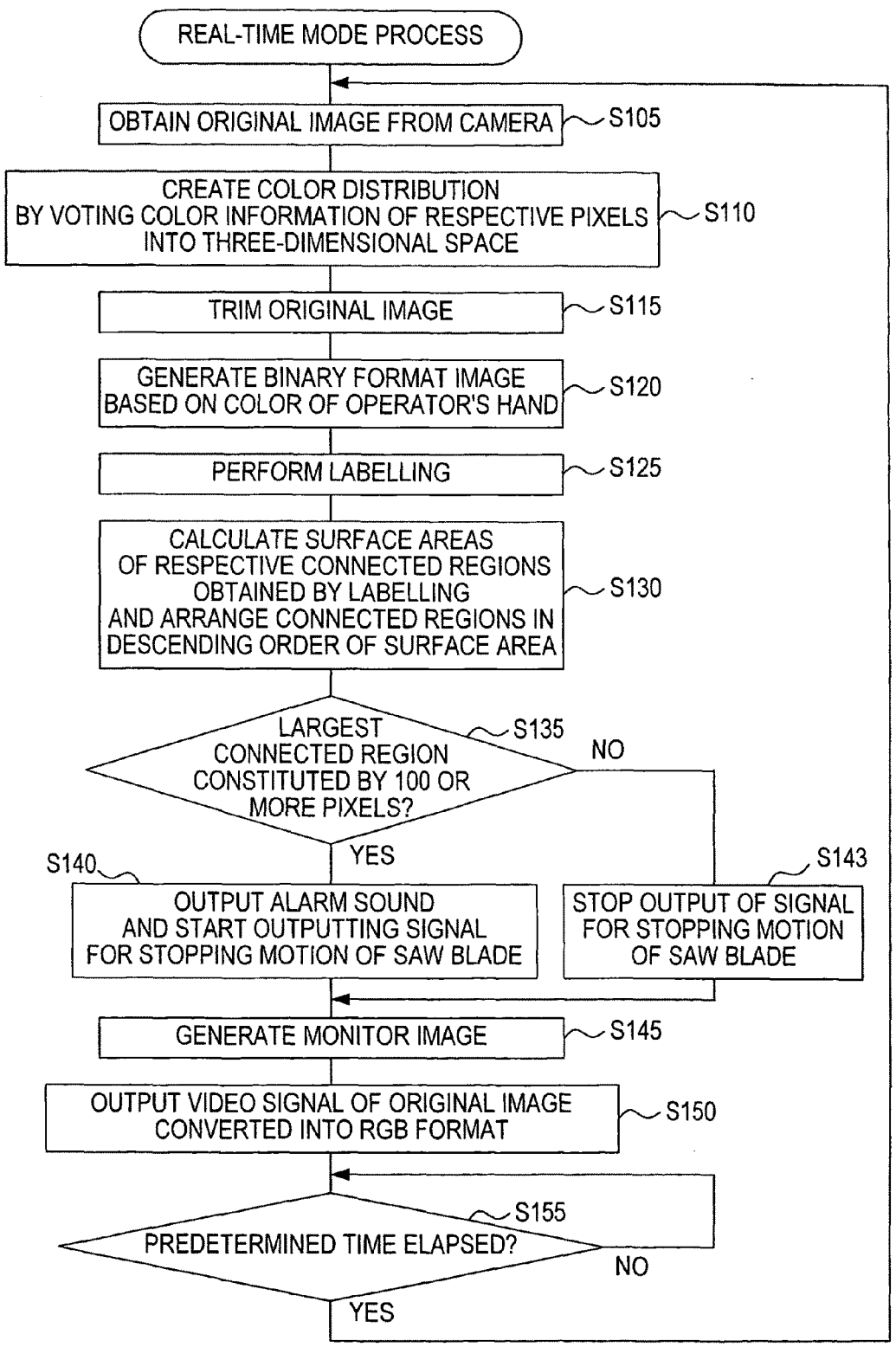
FIG. 3 is a flowchart for illustrating a real-time mode process.

When power supply to the cutting machine 10 is started, the cutting machine 10 is switched to the safety function operating state. Then, the control unit 27 of the control apparatus 20 starts execution of a real-time mode process. The real-time mode process will now be described with reference to the flowchart in FIG. 3.

When execution of the real-time mode process is started, the control unit 27 of the cutting machine 10 obtains a video signal in YUV format from the camera 13, and retrieves one frame of image from the video signal (S105). The one frame of image based on the original video signal obtained from the camera 13 is hereinafter referred to as the "original image".

Figure 4:
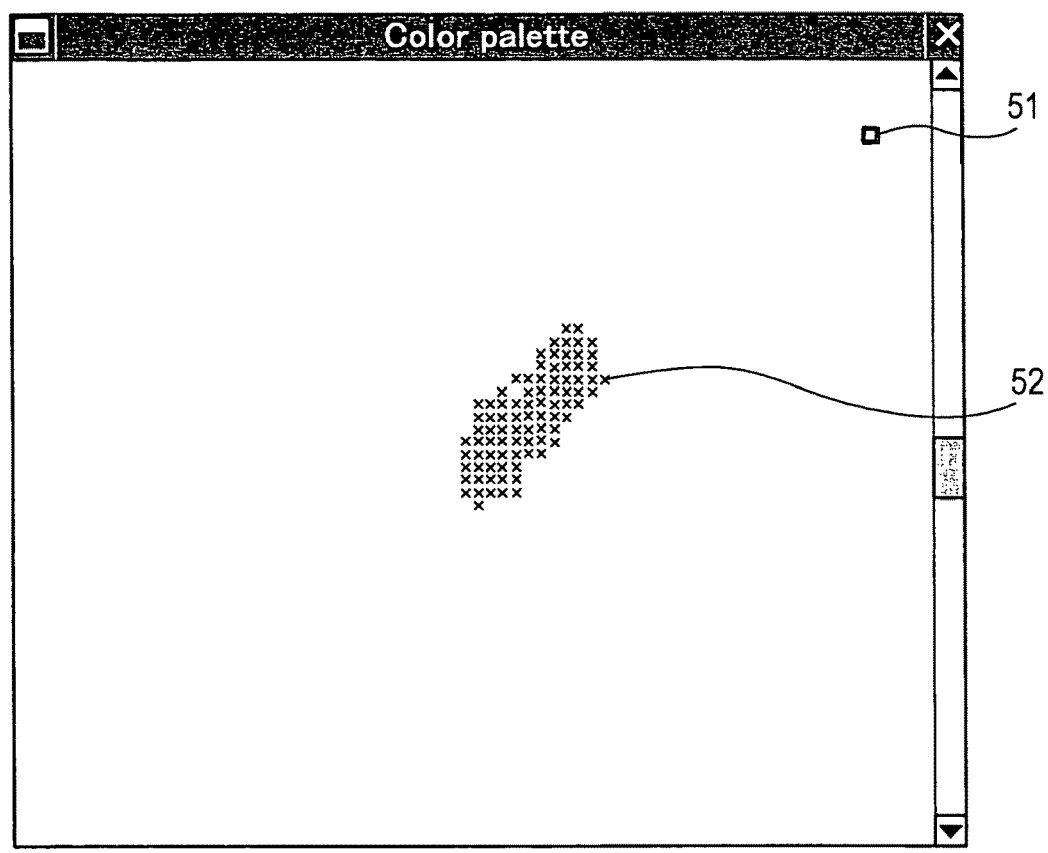
FIG. 4 is an example screen in which a distribution of colors voted in a three dimensional space is two-dimensionalized and is arranged on a color palette.

Subsequently, the control unit 27 creates a color distribution by voting color information of respective pixels of the original image into a three-dimensional YUV space (S110). The color distribution voted in the three-dimensional space is two-dimensionalized and arranged on a color palette as exemplified in FIG. 4. When the color palette in FIG. 4 is divided into grids and one grid is referred to as a "cell" (for example, a cell 51), colors of cells corresponding to positions of × signs in FIG. 4 (for example, ×52) are colors included in the original image. Coloring of the color palettes is omitted in FIG. 4.

Returning to FIG. 3, the control unit 27 then performs trimming of the original image (S115). An area to be cut out in the trimming is previously set as a detection target area, and setting information of the detection target area is stored in the storage unit 23. The setting information may be stored in the storage unit 23 at the time of manufacture of the cutting machine 10, or may be generated by the operator's setting operation of the operation unit 24 and stored in the storage unit 23.

Subsequently, the control unit 27 determines whether or not a color of each of pixels constituting a trimmed image is a specified color to be recognized as a color of the operator's hand thereby to generate a binary format image (S120). This enables distinction of pixels considered to be the operator's hand from other pixels. Information on the specified color to be recognized as the color of the operator's hand is stored in the storage unit 23, and may be modified in the later described adjustment state.

Then, the control unit 27 performs labeling of the binary format image generated in S120 (S125). As a result, groups of pixels considered to be the operator's hand are connected to form connected regions, respectively. The control unit 27 then calculates surface areas of the respective connected regions, which have been obtained by labeling, and arranges the respective connected regions in descending order of surface area (S130).

Next, the control unit 27 determines whether or not a largest connected region is constituted by 100 or more pixels (S135). The number of 100 is a smallest number of pixels that allows determination of a high possibility that a connected region indicates the operator's hand. The number may be set as a fixed value, or may be set by the operator's operation of the operation unit 24. When it is determined that the largest connected region is constituted by 100 or more pixels (S135: Yes), it is determined that the operator's hand is in the detection target area, and the process proceeds to S140. On the other hand, when it is determined that the largest connected region is not constituted by 100 or more pixels (S135: No), it is determined that the operator's hand is not in the detection target area, and the process proceeds to S143.

In S140, the control unit 27 causes the speaker 25 to output an alarm sound (a beep sound) and starts outputting a signal for stopping rotation of the saw blade 14 and a signal for performing rotation starting restriction of the saw blade 14. As a result, rotation of the saw blade 14 in a rotating state is stopped and the saw blade 14 will not start rotation even when the operation switch 15 is operated.

In S143, on the other hand, output of a signal for stopping rotation of the saw blade 14 and a signal for performing rotation starting restriction of the saw blade 14 is stopped. As a result, the saw blade 14 starts rotation when the operation switch 15 is operated by the operator.

Subsequently in S145, the control unit 27 generates a monitor image to be outputted to the display unit 26 from the original image, and converts the generated monitor image into RGB format. A possible method for generating a monitor image is, for example, as follows: With respect to each of the pixels constituting the original image, a pixel of a color specified to be recognized as a color of the table 11 is changed to blue, a pixel of a color specified to be recognized as a color of the operator's hand is changed to orange, and a pixel of a color specified to be recognized as a color of the material to be cut is changed to yellow. Information on such color correspondence is specified by the operator in the later described adjustment state and is stored in the storage unit 23.

Figure 5:
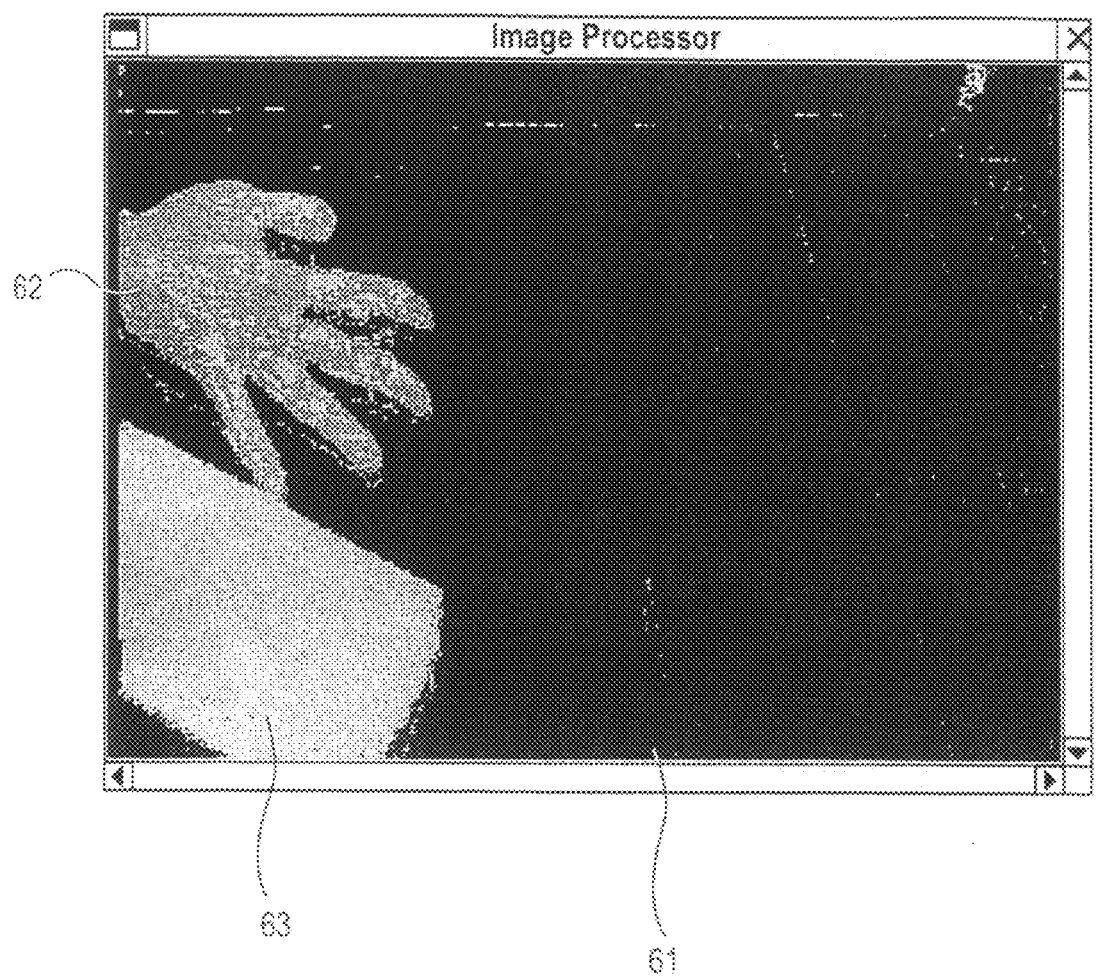
FIG. 5 is an example video image generated by converting pixels which constitute the video image into colors corresponding respectively to regions to which respective pixels belong.

A specific example of a generated image is shown in FIG. 5. In FIG. 5, a darkest pixel (for example, a first pixel 61) is a pixel with the color specified to be recognized as the color of the table 11, a second darkest pixel (for example, a second pixel 62) is a pixel with the color specified to be recognized as the color of the operator's hand, and a third darkest pixel (for example, a third pixel 63) is a pixel with the color specified to be recognized as the color of the material to be cut.

Returning to FIG. 3, the control unit 27 subsequently causes the display unit 26 to display the image converted into RGB format in S145 (S150). Then, the control unit 27 determines whether or not a predetermined time has elapsed since the start of the present step (S155). The "predetermined time" is a waiting time until a next image is obtained by the camera 13, and is a time determined depending on a frame rate of a video image and a processing speed of the control unit 27. When it is determined that the predetermined time has elapsed (S155: Yes), the process returns to S105, while when it is determined that the predetermined time has not elapsed (S155: No), the process remains in the present step until the predetermined time has elapsed.

The real-time mode process executed by the control unit 27 in the safety function operating state has been described as above. Next, effects achieved by the execution of the real-time mode process will be described below.

The control unit 27 determines whether or not the operator's hand is in the detection target area depending on the determination result in S135 as to whether or not the surface area of the connected region of pixels (a pixel set) with the color of the operator's hand is as large as 100 pixels or more. This is a simple determination method, and thus allows a remarkably rapid determination compared with a determination method, such as a pattern matching method, which requires a complex calculation.

According to the pattern matching method, for example, it is impossible to make a determination unless a shape of a hand is sufficiently shown in an image. In contrast, according to the present determination method, it is possible to make a determination before a shape of a hand is sufficiently shown in an image (i.e., immediately after the hand starts entry into the detection target area). According to the cutting machine 11 in the present embodiment, as described above, it is possible to detect the presence of the operator's hand in the detection target area earlier than in conventional machines, and thus to stop the rotating saw blade 14 earlier than in conventional machines.

Further, the control unit 27 performs trimming of the original image obtained by the camera 13 (S115) and makes a determination based on the trimmed image (S135). Specifically, the trimmed image is used as the detection target area. Accordingly, it is not necessary to adjust the detection target area by changing a position of the camera 13 or a zooming degree of the camera 13, and more rapid determination may be achieved since a processing load on the control unit 27 is reduced compared with a case of determination on an entire area (all pixels) of the original image obtained by the camera 13.

Moreover, when the it is determined in S135 that the largest connected region is constituted by 100 or more pixels, the control unit 27 starts outputting not only a signal for stopping rotation of the saw blade 14 but also a signal for performing rotation starting restriction of the saw blade 14 (S140). Accordingly, it is possible to prevent the saw blade 14 from starting rotation by the operation of the operation switch 15 despite the presence of the operator's hand in a vicinity of the stopped saw blade 14.

(2) Adjustment State

The adjustment state will now be described. When the operator performs a predetermined operation on the operation unit 24 of the control apparatus 20 in the safety function operating state, the cutting machine 10 is changed into the adjustment state. Then, the control unit 27 of the control apparatus 20 starts execution of a single capture mode process. The single capture mode process will be described below with reference to the flowchart in FIG. 6.

When execution of the single capture mode process is started, the control unit 27 of the cutting machine 10 obtains a video signal in YUV format from the camera 13, and retrieves one frame of image from the signal (S205). The one frame of image based on the original video image obtained from the camera 13 is hereinafter referred to as the "original image".

Subsequently, the control unit 27 creates a color distribution by voting color information of respective pixels of the original image into a three-dimensional YUV space (S210). Creation of the color distribution is done in a same manner as in S110 of the above-described real-time mode process.

The control unit 27 then performs trimming of the original image (S215). An area to be cut out in the trimming is the same as in the above-described real-time mode process.

Subsequently, the control unit 27 determines whether or not a color of each of pixels constituting a trimmed image is a specified color to be recognized as a color of the operator's hand thereby to generate a binary format image (S220). This allows distinction of pixels considered to be the operator's hand from other pixels. Information on the specified color to be recognized as the color of the operator's hand is stored in the storage unit 23.

Subsequently, the control unit 27 performs labeling of the binary format image generated in S220 (S225). Then, groups of pixels considered to be the operator's hand are connected to form connected regions, respectively. The control unit 27 then calculates surface areas of the respective connected regions obtained by labeling, and arranges the respective connected regions in descending order of surface area (S230).

Next, the control unit 27 determines whether or not a largest connected region is constituted by 100 or more pixels (S235). The determination is performed in a same manner as in S135 of the above-described real-time mode process. When it is determined that the largest connected region is constituted by 100 or more pixels (S235: Yes), it is determined that the operator's hand is in the detection target area, and the process proceeds to S240. On the other hand, when it is determined that the largest connected region is not constituted by 100 or more pixels (S235: No), it is determined that the operator's hand is not in the detection target area, and the process proceeds to S245.

In S240, the control unit 27 causes the speaker 25 to output an alarm sound (a beep sound), and the process proceeds to S245.

In S245, the control unit 27 generates a monitor image to be outputted to the display unit 26 from the original image, and converts the generated monitor image into RGB format. A possible method for generating a monitor image is, for example, the method explained regarding S145 of the above-described real-time mode process.

Subsequently, the control unit 27 causes the display unit 26 to display the image converted into RGB format in S245 (S250).

Then, the control unit 27 determines whether or not any operation in a predetermined range has been performed on the operation unit 24 by the operator (S255). When it is determined that some operation has been performed on the operation unit 24 by the operator (S255: Yes), the process proceeds to S260. When it is determined that any operation has not been performed on the operation unit 24 by the operator (S255: No), the process remains in the present step until any operation is performed on the operation unit 24 by the operator.

In S260, it is determined what operation has been performed. When it is determined that an operation to update the image has been performed, the process returns to the above-described S205, while when it is determined that an operation to modify the information stored in the storage unit 23 has been performed, the process proceeds to S265. The "information stored in the storage unit 23" here means information (for example, YUV parameters) on the color specified to be recognized as the color of the table 11 by the operator, information (for example, YUV parameters) on the color specified to be recognized as the color of the operator's hand, information (for example, YUV parameters) on the color specified to be recognized as the color of the material to be cut, information (for example, vertex coordinates of a rectangle) on the area to be cut out in the trimming, and the like.

Subsequently, the control unit 27 causes the storage unit 23 to store information specified corresponding to the operation performed by the operator (S265). The operation is, for example, an operation to increase parameters of the color to be recognized as the color of the operator's hand, or an operation to widen the area to be cut out in the trimming. When information specified corresponding to the operation is stored in the storage unit 23, the process returns to the above-described S205.

The single capture mode process performed by the control unit 27 in the adjustment state has been described above with reference to the flowchart in FIG. 6. Examples of color palettes and examples of monitor images displayed on the display unit 26 will be described with reference to FIG. 7 and FIG. 8.

Figure 7A:
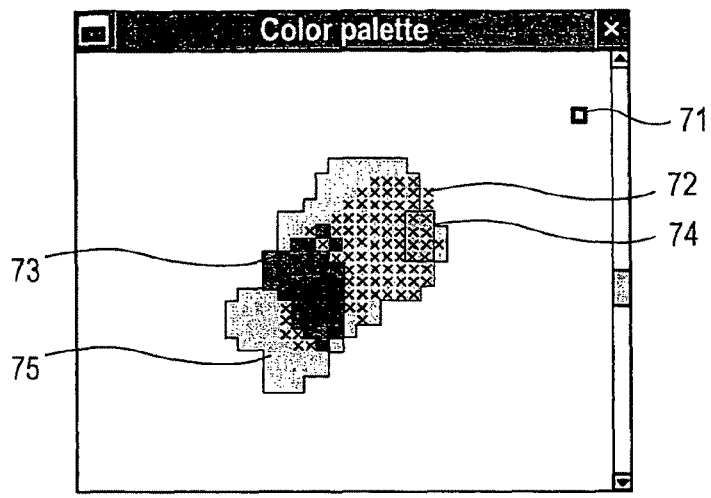
FIGS. 7A-7C are examples of color palettes.
Figure 7B:
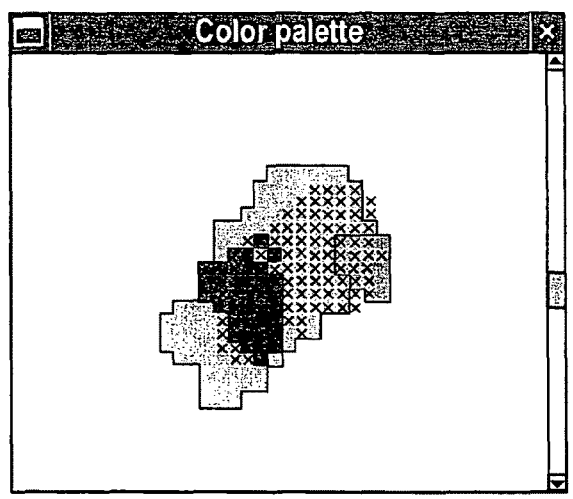

FIGS. 7A and 7B show examples of color palettes. An explanation of color palettes will be provided focusing on FIG. 7A. Provided that the color palette in FIG. 7A is divided into grids and each grid is referred to as a "cell" (for example, a cell 71), colors of cells corresponding to positions of × signs in FIG. 7A (for example, ×72) are the colors included in the original image. Also, a group of cells 73 with a darkest color are a group of cells at positions of the color specified by the operator to be recognized as the color of the table 11. A group of cells 74 with a second darkest color are a group of cells at positions of the color specified by the operator to be recognized as the color of the operator's hand. A group of cells 75 with a third darkest color are a group of cells at positions of the color specified by the operator to be recognized as the color of the material to be cut.

By operating the operation unit 24, the operator specifies a cell at an arbitrary position and specifies as which color (i.e., the color of the table 11, the color of the operator's hand, or the color of the material to be cut) a color at the position should be recognized, and thus may store the information in the storage unit 23.

Figure 7C:
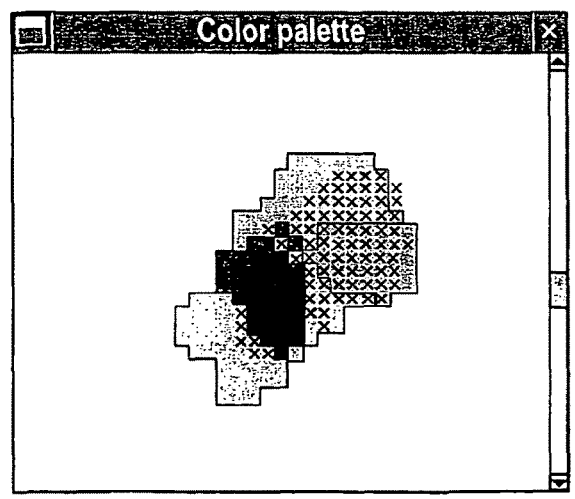
Figure 8A:
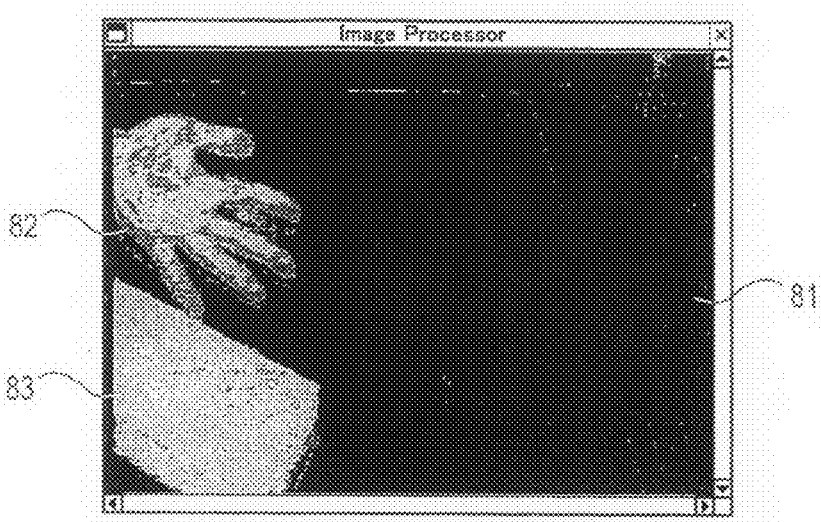
FIGS. 8A-8C are examples of monitor images.
Figure 8B:
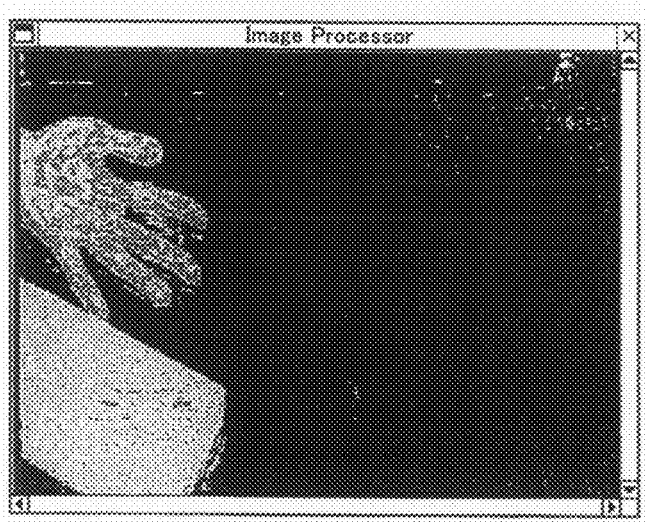
Figure 8C:
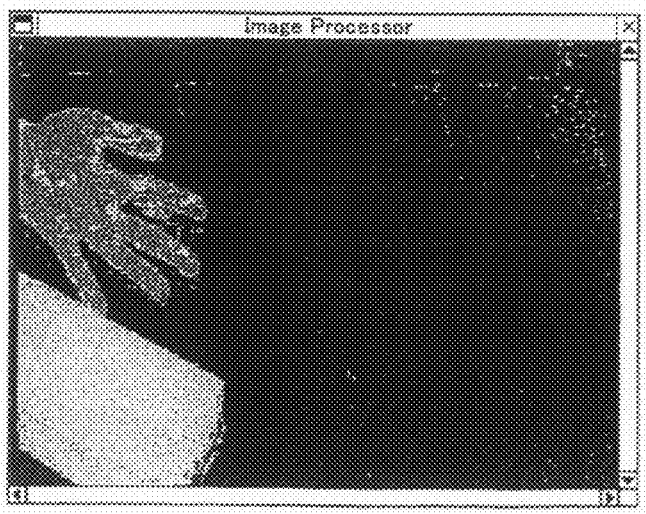

In FIG. 7B, cells specified to be recognized as the color of the operator's hand are increased as compared with FIG. 7A. In FIG. 7C, cells specified to be recognized as the color of the operator's hand are further increased as compared with FIG. 7B. FIGS. 8A, 8B and 8C show monitor images corresponding, respectively, to FIGS. 7A, 7B and 7C.

An explanation of monitor images will be provided focusing on FIG. 8A. Darkest pixels (for example, a first pixel 81) in FIG. 8A are pixels which have, in the original image, the color specified to be recognized as the color of the table 11, and the color is indicated by a darkest shading in FIG. 8A. Second darkest pixels (for example, a second pixel 82) in FIG. 8A are pixels which have, in the original image, the color specified to be recognized as the color of the operator's hand, and the color is indicated by a second darkest shading in FIG. 8A. Third darkest pixels (for example, a first pixel 83) in FIG. 8A are pixels which have, in the original image, the color specified to be recognized as the color of the material to be cut, and the color is indicated by a third darkest shading in FIG. 8A. The same is applicable to both FIG. 8B and FIG. 8C.

It can be seen that as the cells with the second darkest color increase in the order of FIG. 7A, FIG. 7B and FIG. 7C, the pixels with the second darkest shading increase in a shape of the operator's hand in the order of FIG. 8A, FIG. 8B and FIG. 8C.

The single capture mode process executed by the control unit 27 in the adjustment state has been described as above. Next, effects achieved by executing the single capture mode process will be described below.

According to the cutting machine 10 in the present embodiment, the operator may set the color to be recognized as the color of the table 11, the color to be recognized as the color of the operator's hand, and the color to be recognized as the color of the material to be cut. Accordingly, it is possible to independently set each of the color to be recognized as the color of the table 11, the color to be recognized as the color of the operator's hand, and the color to be recognized as the color of the material to be cut, in accordance with individual differences in skin color and differences in color of various types of materials to be cut.

Also, since the color palettes as in FIGS. 7A-7C and the monitor images as in FIGS. 8A-8C are displayed on the display unit 26 during setting, the operator may perform the setting while looking at the color palettes and the monitor images, and thus may perform adjustment or the like of the setting easily.

Further, since each of the color palettes in FIGS. 7A-7C shows the distribution of colors included in the original image with the x signs, the operator may perform appropriate setting of the color to be recognized as the color of the table 11, the color to be recognized as the color of the operator's hand, and the color to be recognized as the color of the material to be cut, while looking at the color palettes.

Other Embodiments (1) In the above described embodiment, the color palettes as in FIGS. 7A-7C and the monitor images as in FIGS. 8A-8C are displayed on the display unit 26, and the operator performs the setting of the color to be recognized as the color of the operator's hand, and the like, while looking at the color palettes and the monitor images. However, if the control apparatus 20 does not include the above-described display unit 26, the operator cannot perform the setting of the color to be recognized as the color of the operator's hand, while looking at the color palettes and the monitor images displayed on the display unit 26. In this case, therefore, it is preferable that when a predetermined operation is preformed on the operation unit 24, colors included in a predetermined area of a video image taken by the camera 13 are recognized as the color of the operator's hand, and information of the colors is stored in the storage unit 23. This process (a stop color setting process) will be described below with reference to the flowchart of FIG. 9.

When the stop color setting process is started, the control unit 27 of the cutting machine 10 obtains a video signal in YUV format from the camera 13, and retrieves one frame of image from the signal (S305). The one frame of image based on the original video signal obtained from the camera 13 is hereinafter referred to as the "original image".

Subsequently, the control unit 27 performs trimming of the original image (S310). It is suitable that an area to be cut out in the trimming is approximately as large as can be occupied by only the operator's hand. Specifically, it is suitable that the area is defined such that when the operator holds the hand toward the camera 13, an image after the trimming is constituted by only the operator's hand.

Subsequently, the control unit 27 creates a color distribution by voting color information of respective pixels of the image after the trimming into a three-dimensional YUV space (S315). The numbers of pixels voted to the respective colors in the color distribution are counted.

Then, the control unit 27 regards a color, to which a predetermined number of pixels or more are voted in the color distribution, as the color to be recognized as the color of the operator's hand, and causes the storage unit 23 to store information (for example, YUV parameters) about the color to be recognized as the color of the operator's hand (S320).

Subsequently, the control unit 27 notifies the operator through the speaker 25 that information about the color to be recognized as the color of the operator's hand has been stored in the storage unit 23 (S325). Specifically, for example, notification may be made by outputting a voice "The color of hand has been recognized," from the speaker 25. When the notification is completed, the control unit 27 terminates the present process (the stop color setting process).

Figure 9:
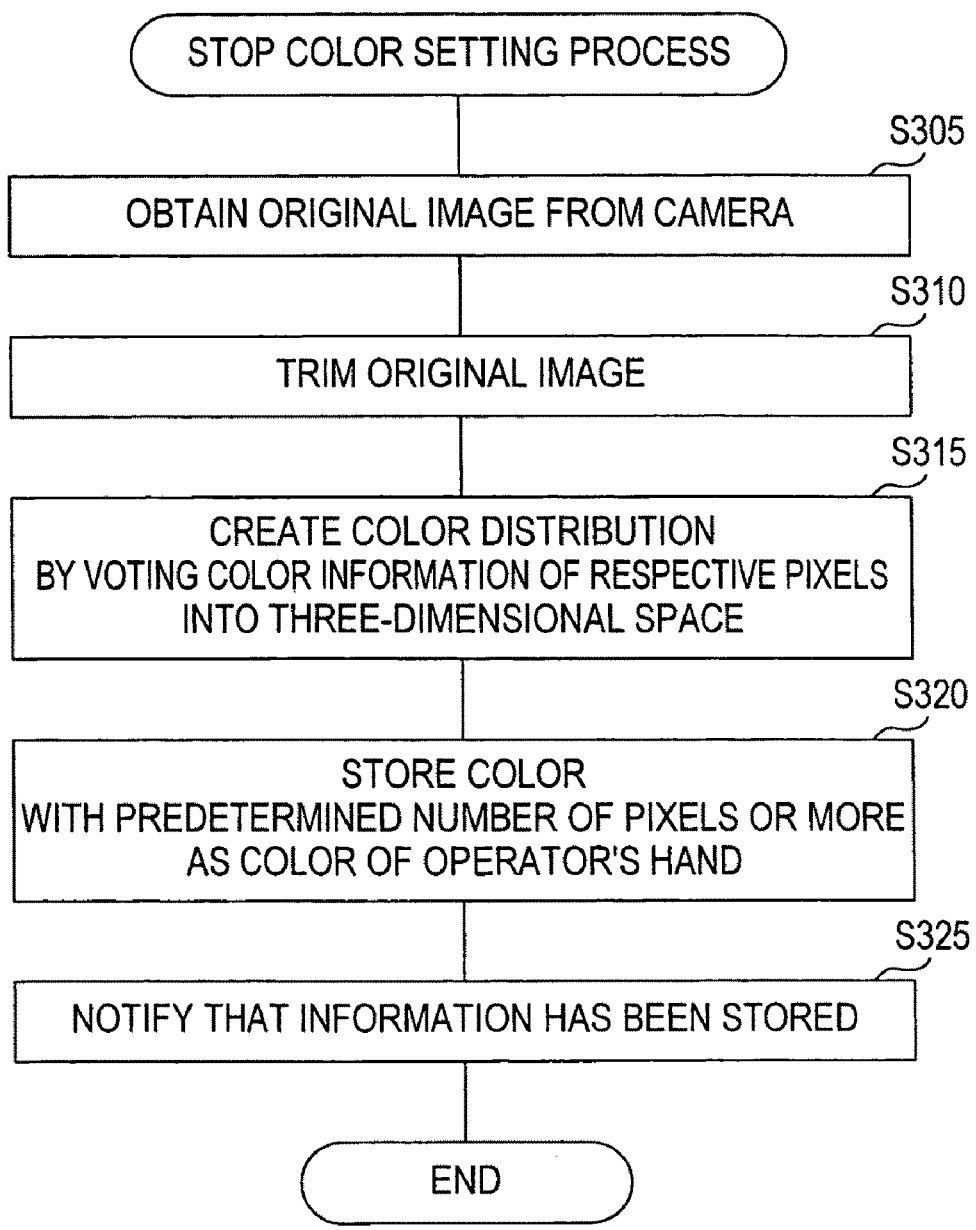
FIG. 9 is a flowchart for illustrating a stop color setting process.

As above, the stop color setting process has been described with reference to the flowchart of FIG. 9. According to the cutting machine 10 that executes the stop color setting process, it is possible to easily and appropriately set a color to be recognized as the color of the operator's hand since setting of the color can be performed by imaging the operator's hand with an imaging device.

(2) In another embodiment, it may be configured such that after a predetermined event occurs, rotation of the saw blade is restricted until information on the color to be recognized as the color of the operator's hand is newly stored in the storage unit 23. A process to achieve the above (a process at event occurrence) will now be described with reference to the flowchart of FIG. 10. Execution of the process at event occurrence is started when an event, such as, for example, "a starting of power supply to the cutting machine", "an operation of the saw blade rotation stop switch", or "reaching of a counted value indicating a rotation stop duration of the saw blade to a predetermined value" occurs.

When execution of the process at event occurrence is started, the control unit 27 of the cutting machine 10 deletes the setting information stored in the storage unit 23 (S405). The setting information to be deleted is the information on the color to be recognized as the color of the operator's hand. When the information on the color to be recognized as the color of the table 11 or the information on the color to be recognized as the color of the material to be cut is stored, such information should be deleted. If any setting information is not stored in the storage unit 23, the present step is skipped.

Subsequently, the control unit 27 starts outputting a signal for stopping rotation of the saw blade 14 and a signal for performing rotation starting restriction of the saw blade 14 to the electric motor (S410). As a result, rotation of the saw blade 14 in a rotating state is stopped and the saw blade 14 in a stopped state is prevented from further rotation.

Then, the control unit 27 determines whether or not setting information has been newly registered (stored) after the deletion in S405 (S415). The registration of setting information is performed by the above-described single capture mode process or the stop color setting process. When the control unit 27 determines in S415 that setting information has been newly registered (S415: Yes), the process proceeds to S420, while when the control unit 27 determines that setting information has not been newly registered (S415: No), the process remains in the present step (S415) until setting information is newly registered.

In S420, the control unit 27 stops output of the signals (the signal for stopping rotation of the saw blade 14 and the signal for performing rotation starting restriction of the saw blade 14) which are started to be outputted in S410. Then, the control unit 27 terminates the present process (the process at event occurrence).

Figure 10:
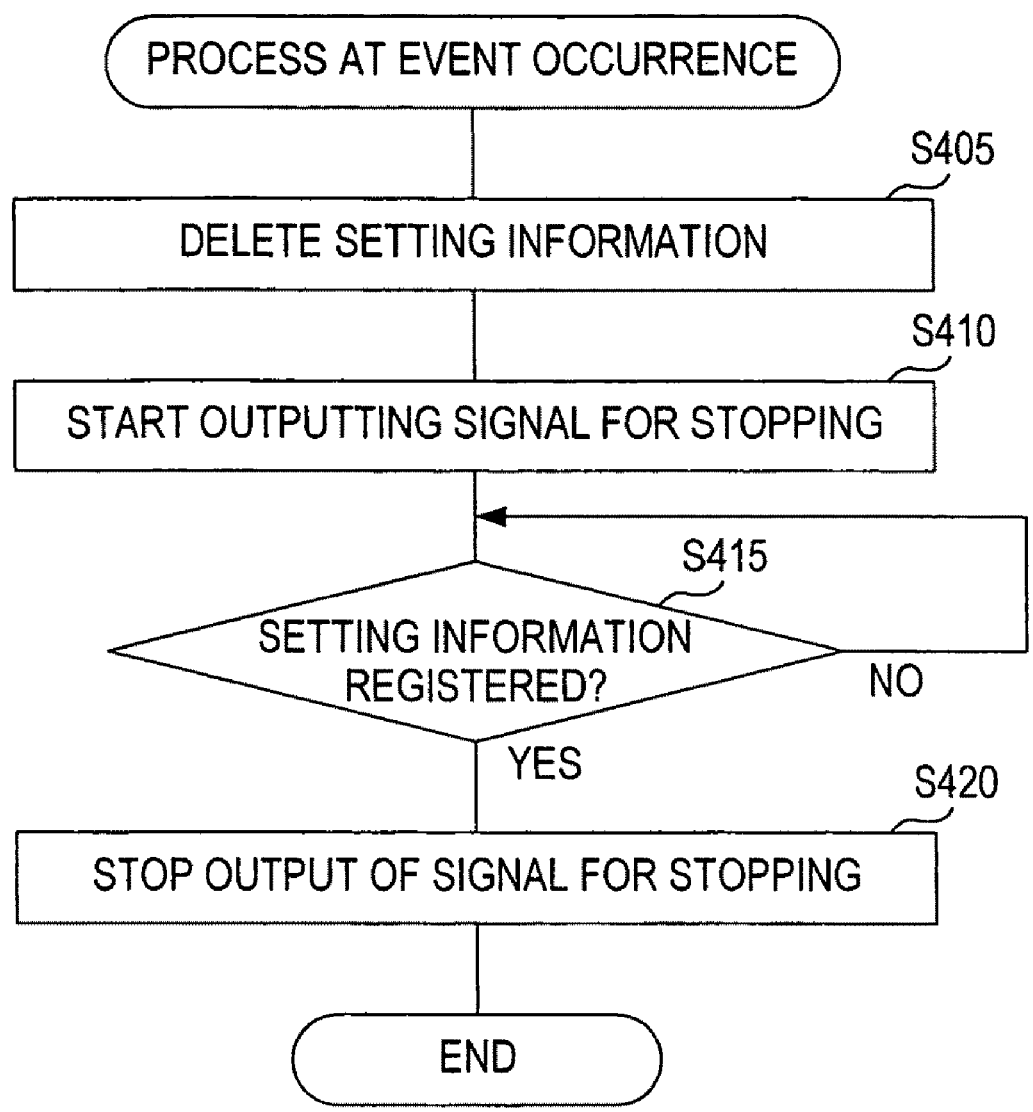
FIG. 10 is a flowchart for illustrating a process at event occurrence.

As above, the process at event occurrence has been described with reference to the flowchart of FIG. 10. According to the cutting machine 10 that executes the process at event occurrence, after a predetermined event occurs, the saw blade 14 cannot be rotated until information on the color to be recognized as the color of the operator's hand is newly set. Accordingly, after a predetermined event occurs, setting of the information is necessarily performed. Thus, the cutting machine 10 is likely to be used in a state corresponding to the operator who uses the cutting machine 10.

The present invention should not be limited to the embodiments described above, but may be embodied in a variety of forms within the technical scope of the present invention.

The control unit 27, which is constituted by the CPU 271 and others in the above embodiments, may be constituted by an ASIC (Application Specific Integrated Circuits) or a programmable logic device, such as FPGA (Field Programmable Gate Array).

While the storage unit 23 in the control apparatus 20 is used as a recording medium of a program for the control process in the above embodiments, the ROM 273 or the RAM 272 in the control unit 27 may be used instead.

Also, the program for the control process may be recorded in computer-readable recording media other than a ROM and a RAM. Such recording media include, for example, a flexible disk (FD), an optical disk (MO), a DVD, a CD-ROM, a Blu-Ray disk, an HD-DVD, a hard disk, and a portable semiconductor memory (e.g., a USB memory, a memory card, etc.).

Further, the program for the control process may be provided to the control apparatus 20 through a network.

What is claimed is:

1. A cutting machine for cutting a material to be cut, which is placed on a table, with a rotating saw blade, the cutting machine comprising:
    an imaging device that takes a video image of an area on the table and outputs the video image;
    a determination device that makes a determination on whether or not a number of pixels of a specific color, which is previously set, exceeds a predetermined threshold in one frame of image constituting the video image outputted from the imaging device,
    wherein the determination device makes the determination by generating a binary format image from the one frame of image constituting the video image outputted from the imaging device, depending on whether or not each of pixels has the specific color which is previously set or another color, performing labeling of the binary format image, and determining whether or not a number of pixels constituting a largest connected region among connected regions obtained by the labeling exceeds a predetermined threshold, and
    wherein the determination device performs labeling of the binary format image by identifying the connected regions and assigning each connected region with a unique label, each connected region being a set of pixels that form a connected group and that are counted; and
    a stopping device that stops rotation of the saw blade when it is determined by the determination device that the number of pixels of the specific color exceeds the predetermined threshold.

2. The cutting machine according to claim 1, wherein the determination device makes the determination covering pixels which are present in a predetermined area in the one frame of image constituting the video image outputted from the imaging device.

3. The cutting machine according to claim 1, further comprising:
    a storage device that stores information on the specific color to which the determination device refers; and
    a setting device that determines the specific color based on the video image outputted from the imaging device.

4. The cutting machine according to claim 1, further comprising:
    a display device that displays a color palette;
    a storage device that stores information on the specific color to which the determination device refers; and
    a setting device that causes the storage device to store a color at a position, which is specified by an operator on the color palette displayed on the display device, as the specific color.

5. The cutting machine according to claim 1, further comprising:
    a second restriction device that restricts restart of rotation of the saw blade, when it is determined by the determination device that the number of pixels of the specific color exceeds the predetermined threshold.

6. The cutting machine according to claim 3, further comprising:
    a first restriction device that restricts rotation of the saw blade, once a predetermined event occurs, until information on the specific color is newly stored in the storage device by the setting device.

7. The cutting machine according to claim 4, wherein the display device displays areas in the color palette corresponding respectively to colors included in the one frame of image constituting the video image outputted from the imaging device so as to be distinguishable from areas corresponding to colors not included in the one frame of image.

8. A control unit for an electric saw, comprising:
    a video image obtaining device that obtains, from an imaging device which takes a video image of an area on a table, the video image;
    a determination device that generates a binary format image from one frame of image constituting the video image obtained by the video image obtaining device, depending on whether or not each of pixels has a specific color which is previously set or another color, performs labeling of the binary format image, and determines whether or not a number of pixels constituting a largest connected region among connected regions obtained by the labeling exceeds a predetermined threshold,
    wherein the determination device performs labeling of the binary format image by identifying the connected regions and assigning each connected region with a unique label, each connected region being a set of pixels that form a connected group and that are counted; and
    a stopping device that stops rotation of a saw blade when it is determined by the determination device that the number of pixels exceeds the predetermined threshold.

9. A non-transitory recording medium readable by a computer, the non-transitory recording medium recording a program for causing the computer to execute:

a video image obtaining step of obtaining, from an imaging device which takes a video image of an area on a table, the video image;

a determination step of generating a binary format image from one frame of image constituting the video image obtained in the video image obtaining step, depending on whether or not each of pixels has a specific color which is previously set or another color, performing labeling of the binary format image, and determining whether or not a number of pixels constituting a largest connected region among connected regions obtained by the labeling exceeds a predetermined threshold, wherein, in the determination step, labeling of the binary format image is performed by identifying the connected regions and assigning each connected region with a unique label, each connected region being a set of pixels that form a connected group and that are counted; and a stopping step of stopping rotation of a saw blade when it is determined in the determination step that the number of pixels exceeds the predetermined threshold.

* * * * *